(12) United States Patent
Davies et al.

(10) Patent No.: US 6,483,805 B1
(45) Date of Patent: Nov. 19, 2002

(54) INTERNET DIFFERENTIATED SERVICES SERVICE FOR TRANSACTION APPLICATIONS

(75) Inventors: Elwyn Brian Davies, Ely (GB); Alan Stanley John Chapman, Kanata (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/221,778

(22) Filed: Dec. 28, 1998

(51) Int. Cl.⁷ .............................................. G01R 31/08
(52) U.S. Cl. ...................................... 370/235; 370/252
(58) Field of Search ................................ 370/231, 232, 370/233, 235, 236, 394, 389, 392, 253, 400, 401, 395.2, 395.21, 395.52, 351–356, 252

(56) References Cited

U.S. PATENT DOCUMENTS

| | | | |
|---|---|---|---|
| 5,805,599 A | * 9/1998 | Mishra et al. | 370/468 |
| 6,038,216 A | * 3/2000 | Packer | 370/231 |
| 6,046,980 A | * 4/2000 | Packer | 370/230 |
| 6,084,855 A | * 7/2000 | Soirinsuo et al. | 370/235 |
| 6,160,793 A | * 12/2000 | Ghani et al. | 370/236 |
| 6,215,766 B1 | * 4/2001 | Kim | 370/230 |
| 6,222,839 B1 | * 4/2001 | Nakazaki et al. | 370/352 |
| 6,240,463 B1 | * 5/2001 | Benmohamed et al. | 370/238 |
| 6,249,530 B1 | * 6/2001 | Blanco et al. | 370/468 |
| 6,272,540 B1 | * 8/2001 | Yadav et al. | 709/217 |
| 6,286,052 B1 | * 9/2001 | McCloghrie et al. | 370/235 |
| 6,289,013 B1 | * 9/2001 | Lakshman et al. | 370/389 |
| 6,353,616 B1 | * 3/2002 | Elwalid et al. | 370/389 |

OTHER PUBLICATIONS

The Internet Protocol, William Stallings, High–Speed Networks, TCP/IP and ATM Design Principles, 1998, pp. 302–317.*

Adiseshu, H.; Parulkar, G.; Yavatkar, R., A state management protocol for IntServ, DiffServ and Label Switching, Network Protocols, 1998. Proceeding. Sixth International Conference, pp. 272–281.*

IETF RFC 2475 Blake, et al. "Architecture for Differentiated Services" The Internet Society (1998).

* cited by examiner

*Primary Examiner*—David Vincent
(74) *Attorney, Agent, or Firm*—Lee, Mann, Smith, McWilliams, Sweeney & Ohlson

(57) ABSTRACT

A method of monitoring telecommunications network traffic comprising the steps of: receiving a packet stream comprising packets each identified as belonging to one of at least three classes; calculating a difference between the numbers of packets received identified as belonging to a first and a second of said classes; and deriving a measure of traffic load on the network responsive to said difference. The invention also relates to a method for admission control based on the above method of monitoring and a method for overcoming admission control avoidance. It also relates to apparatus embodying these methods.

29 Claims, 6 Drawing Sheets

INTERNET DIFFERENTIATED SERVICES SERVICE FOR TRANSACTION APPLICATIONS

FIELD OF THE INVENTION

The present invention relates to a method and apparatus for measuring and controlling the load carried by a telecommunications system for transactional applications, and a system incorporating the same.

BACKGROUND TO THE INVENTION

Packet switched networks achieve very high speed by keeping the amount of interpretation of each packet at nodes in the heart of the network to a minimum. In general, two decisions need to be made about the packet at each node it encounters: which output link it is to be directed to; and what treatment (e.g. prioritisation) it should be given within the node, both absolutely and relative to other packets.

In production networks using the Internet Protocol version 4 (IPv4) the decisions have until very recently been based on a very limited subset of the fields in the IP header. Typically the output decision is made solely on the basis of the destination address. Treatments within a node are restricted to two classes of prioritisation for normal data traffic and network control traffic, based on two distinct values of the Precedence field (part of the Type of Service (ToS) octet). Network control traffic, which is generated entirely by the administrative and operational mechanisms of the network rather than by users, is typically given absolute priority over all other traffic. All user traffic (the remainder) is treated identically. Normally no guarantees are offered as to the delivery of the traffic, and the service offered to users of these networks are described as 'best efforts' services.

Thus in each node (router, host workstation) which routes or forwards packets in an IPv4, each packet which arrives on an incoming or ingress interface is treated as follows:

The packet is read from the incoming interface

The destination Address field and, optionally, the Type of Service (ToS) field are extracted from the packet The Destination Address field and, optionally, the ToS field are used as indices into a forwarding table constructed by means of the dynamic routing protocols to find the correct output link for the packet. Routing responsive to the contents of the ToS field is currently extremely uncommon although it has in principal been available since the early definition of IP.

If the node is able to provide differential treatment of packets directed to a given output, the ToS field is inspected to determine the treatment to be given. Typically differential treatment is based on the Precedence value in the ToS field, and may be limited to two distinct classes of treatment, one for network control traffic (a small but vital component) and a second for normal data traffic (the rest); the classes of traffic are directed into a set of distinct first-in, first-out (FIFO) queues associated with each output.

The packets are scheduled into the available output bandwidth from the queues according to a scheduling algorithm. Typically this is an absolute priority mechanism in which any network control packet is given absolute priority over any normal data packet: if there are any network control packets waiting when a slot is available on the output link, the packet at the head of the network control traffic queue will be output onto the link and the packet removed from the queue in preference to any waiting normal packets. Otherwise, if there is a packet waiting on the normal data traffic queue, it will be output and removed from the queue.

Some current routers include more complex mechanisms, such as additional classification, filtering, queuing, and scheduling mechanisms but there is no uniformity as to how these facilities are invoked, and they are not widely deployed in production networks.

The limited capabilities of the existing IP networks to be able to differentiate classes of traffic restrict the ability of network operators to offer services with enhanced quality of service (QoS) to their customers. By QoS we mean such things as constraints on the delay experienced by a packet, the variation in delays experienced by a packet, the relative priority for packets of a particular class, and the amount of bandwidth available to a class of packets passing through a network.

It is becoming clear that certain customers and types or application need (and customers would be prepared to pay for) a service that is an improvement over the existing best efforts service.

One of groups of the services that is likely to be most used to users of an IP data network is transactional services. Transactional services include, but are not limited to World-Wide Web accesses and Remote Procedure Call invocations including, for example, interactive database accesses. Transactional services are a major component—perhaps as much as 70%—of today's data traffic.

Within an IP packet switched data network all data is carried in the form of IP 'datagrams'. An IP datagram is a packet consisting of an IP header and an IP payload as shown in FIG. 2.

The IP Header provides all the information needed to route the packet through the network.

IP datagrams are used to carry the information of numerous different protocols across the network (the protocol in use is indicated by a specific bit pattern in the Protocol field of the IP header). One of these protocols is the Transport Control Protocol (TCP) reliable byte stream transport protocol. In this case the IP payload is made up of a TCP header and the TCP user payload data. TCP is used as the transporting protocol for a large fraction of all user traffic carried across IP networks.

The TCP header is used to carry information which allows the receiving station to reconstruct the transmitted byte stream thereby achieving the desired reliability of delivery. Packets successfully received at the receiving end of a connection are positively acknowledged by the sending of a specific acknowledgement back to the origin of the packet.

A fundamental characteristic of TCP is its ability to adapt the rate of flow of data across a network to provide near optimal use of the available network bandwidth. TCP conforms its transmission rate to the available bandwidth by:

Increasing its transmission rate in response to successful receipt and acknowledgement of packets Reducing its transmission rate in response to missing acknowledgements, indicating packet loss (typically due to network congestion).

In normal operation, the flow rate of a TCP flow starts at a low value and ramps up through a 'slow start phase' and a 'congestion avoidance phase' to a maximum value as the first few packets are acknowledged. At some point in this initial ramp up either all data will have been sent or a packet will be lost. If a packet is lost (indicated by missing acknowledgements) the flow rate is reduced by 50% and ramp up restarts from the reduced value.

If multiple packets are lost, the flow is reduced to a minimum and the whole process repeats after a delay designed to allow the network to recover from the congestion that caused the dropped packets. Typically transactional services open a TCP reliable byte stream connection from a client to a server and issue a 'request' which is in the order of a few tens to a few hundreds of bytes long (i.e. one or two packets). The request is sent from the client to a server which processes it, performing some local operation and then returns some 'response' data which may vary from a few bytes (such as a success code) to a few tens of kilobytes (such as an image for a web page) over a period of between, say, a few hundred milliseconds to 20 seconds.

One problem in integrating such transactional services into most standard QoS schemes is that the overhead of reserving resources to guarantee the delivery of the data is out of proportion to the size of the data delivered and the limited persistence of the connection. Each transaction or small set of transactions is likely to need a separate reservation especially in the web access service case.

A further problem lies in that the short duration of the flow associated with a request or response does not allow the conventional flow control algorithms of TCP to achieve steady state. This tends to mean that the flow may be categorised as 'fragile': loss of a single packet will set the TCP flow control algorithm back into slow start mode with consequential impact on the throughput of the connection. By contrast a well established flow, relies on a few dropped packets to control the bandwidth used and TCP is designed to cope with occasional dropped packets once steady state is established.

A third problem is that the inherent burstiness of human-mediated interactions (for example web accesses) makes it difficult to put in place a service which will allow the network to control or predict the load of such transactions and hence to offer predictable service for them.

Furthermore, the essentially random destinations to which web accesses are directed makes provisioning of such services difficult.

OBJECT TO THE INVENTION

The invention seeks to provide an improved method and apparatus for packet-by-packet admission control whereby to support implementation of Differentiated Services in a packet-switched network.

SUMMARY OF THE INVENTION

According to a first aspect of the present invention there is provided a method of monitoring telecommunications network traffic comprising the steps of: receiving a packet stream comprising packets each identified as belonging to one of at least three classes; calculating a difference between the numbers of packets received identified as belonging to a first and a second of said classes; and deriving a measure of traffic load on the network responsive to said difference.

Preferably the method also comprises the steps of: providing statistical distribution data descriptive of said traffic load; deriving said measure of traffic load on the network responsive to said statistical distribution data.

In a preferred embodiment said first class is indicative of the beginning of a transactional burst, and said second class is indicative of the end of a transactional burst.

Preferably each initial packet of a transactional burst is identified as belonging to said first class and each final packet of a transactional burst is identified as belonging to said second class.

In a preferred embodiment wherein a transactional burst comprises a single packet, said packet is marked as belonging both to said first and to said second classes.

Preferably an indication of which class a packet belongs to is contained in the header of said packet.

In a preferred embodiment said packet is of an Internet protocol.

In one preferred embodiment, said packet is of an Internet Protocol version 4 having a header and said indication is located within a second octet of said header.

In a second preferred embodiment said packet is of an Internet Protocol version 6 having a header and said indication is located within the bits 4–7 of a first octet and bits 0–3 of a second octet of said header.

In one preferred embodiment wherein said header comprises a DSCP field, said indications are encoded using four values of said DSCP field.

According to a second aspect of the present invention there is provided a method of performing packet data network admission control comprising the steps of: receiving a packet stream comprising packets each identified as belonging to one of at least three classes; calculating a difference between the numbers of packets received identified as belonging to a first and a second of said classes; deriving a measure of traffic load on the network responsive to said difference; and accepting and rejecting packets responsive to said measure.

In a preferred embodiment, the method of performing packet data network admission control comprises the steps of: receiving a packet on a given traffic flow; if said packet is of a first class indicative of the start of a new traffic burst then, if a previously stored measure of current traffic load is indicative of an admission rejection condition being satisfied in respect of said received packet discard said packet, otherwise increment said measure and forward said packet; if said packet is of a second class not indicative of the start or end of a traffic burst then forward said packet; and if said packet is of a third class indicative of the end of a traffic burst then decrement said measure of current traffic load and forward said packet.

Preferably, said measure of current load is a difference between the number of packets of said first class previously forwarded and the number of packets of said third class previously forwarded.

Preferably, an indication of which class a packet belongs to is contained in the header of said packet.

Preferably, said packet is of an Internet protocol.

In a first preferred embodiment, said packet is of an Internet Protocol version 4 having a header and said indication is located within a second octet of said header.

In a second preferred embodiment, said packet is of an Internet Protocol version 6 having a header and said indication is located within the bits 4–7 of a first octet and bits 0–3 of a second octet of said header.

In one preferred embodiment wherein said header comprises a DSCP field, said indications are encoded using four values of said DSCP field.

According to a third aspect of the present invention there is provided a method of preventing abuse of the admission control method comprising the steps of: receiving a traffic flow comprising data packets; monitoring the rate of occurrence of packets indicative of starts and ends of transactional bursts within said traffic flow; if said rate meets a suspected-abuse criterion, a first packet received on said traffic flow is marked as indicative of the start of a transaction and a second packet received on said traffic flow is marked as indicative of the end of a transaction; if said packet is marked as indicative of the start of a new transaction then, if a previously stored measure of current traffic load is indicative of an admission rejection condition being satisfied in respect of said received packet discard said packet, otherwise increment said measure and forward said packet; if said packet is marked as not indicative of the start or end of a traffic burst then forward said packet; and if said packet is marked as indicative of the end of a transaction then decrement said measure of current traffic load and forward said packet.

According to a fourth aspect of the present invention there is provided a method of transmitting traffic load information within a packet data stream comprising transactional bursts, comprising the steps of: labelling each initial packet of transactional bursts as belonging to a first class; labelling each final packet of transactional bursts as belonging to a second class; labelling each other packet of transactional bursts as belonging to one or more further distinct classes whereby to identify starts and ends of such transactional bursts within a packet data stream.

According to a fifth aspect of the present invention there is provided a packet network node comprising: an input arranged to receive a packet stream comprising packets each identified as belonging to one of at least three classes; a processor arranged to calculate a difference between the numbers of packets received identified as belonging to a first and a second of said classes and to calculate a measure of traffic load on the network responsive to said difference.

According to a sixth aspect of the present invention there is provided a packet network node comprising: an input arranged to receive a packet traffic flow; a processor arranged to determine for each packet received on said traffic flow, (a) whether said packet is of a first class indicative of the start of a new traffic burst and if so, to determine whether a previously stored measure of current traffic load is indicative of an admission rejection condition being satisfied in respect of said received packet and if so to discard said packet and otherwise to increment said measure and forward said packet, (b) whether said packet is of a second class not indicative of the start or end of a traffic burst and if so to forward said packet, and (c) whether said packet is of a third class indicative of the end of a traffic burst and if to decrement said measure of current traffic load and forward said packet.

According to a seventh aspect of the present invention there is provided a packet network node for preventing abuse of admission control comprising: an input arranged to receive a packet traffic comprising data packets; a processor arranged to monitor the rate of occurrence of packets indicative of starts and ends of transactional bursts within said traffic flow; if said rate meets a suspected-abuse criterion, to mark a first packet received on said traffic flow as indicative of the start of a transaction and to mark a second packet received on said traffic flow as indicative of the end of a transaction; if said packet is marked as indicative of the start of a new transaction then, if a previously stored measure of current traffic load is indicative of an admission rejection condition being satisfied in respect of said received packet to discard said packet, otherwise to increment said measure and forward said packet; if said packet is marked as not indicative of the start or end of a traffic burst then to forward said packet; and if said packet is marked as indicative of the end of a transaction then to decrement said measure of current traffic load and to forward said packet.

According to an eighth aspect of the present invention there is provided a communications system comprising apparatus according to any one of the foregoing aspects of the present invention.

The invention also provides for a system for the purposes of digital signal processing which comprises one or more instances of apparatus embodying the present invention, together with other additional apparatus.

According to a ninth aspect of the present invention there is provided a program for a computer on a machine-readable medium embodying a method according to any one of the foregoing aspects of the present invention.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
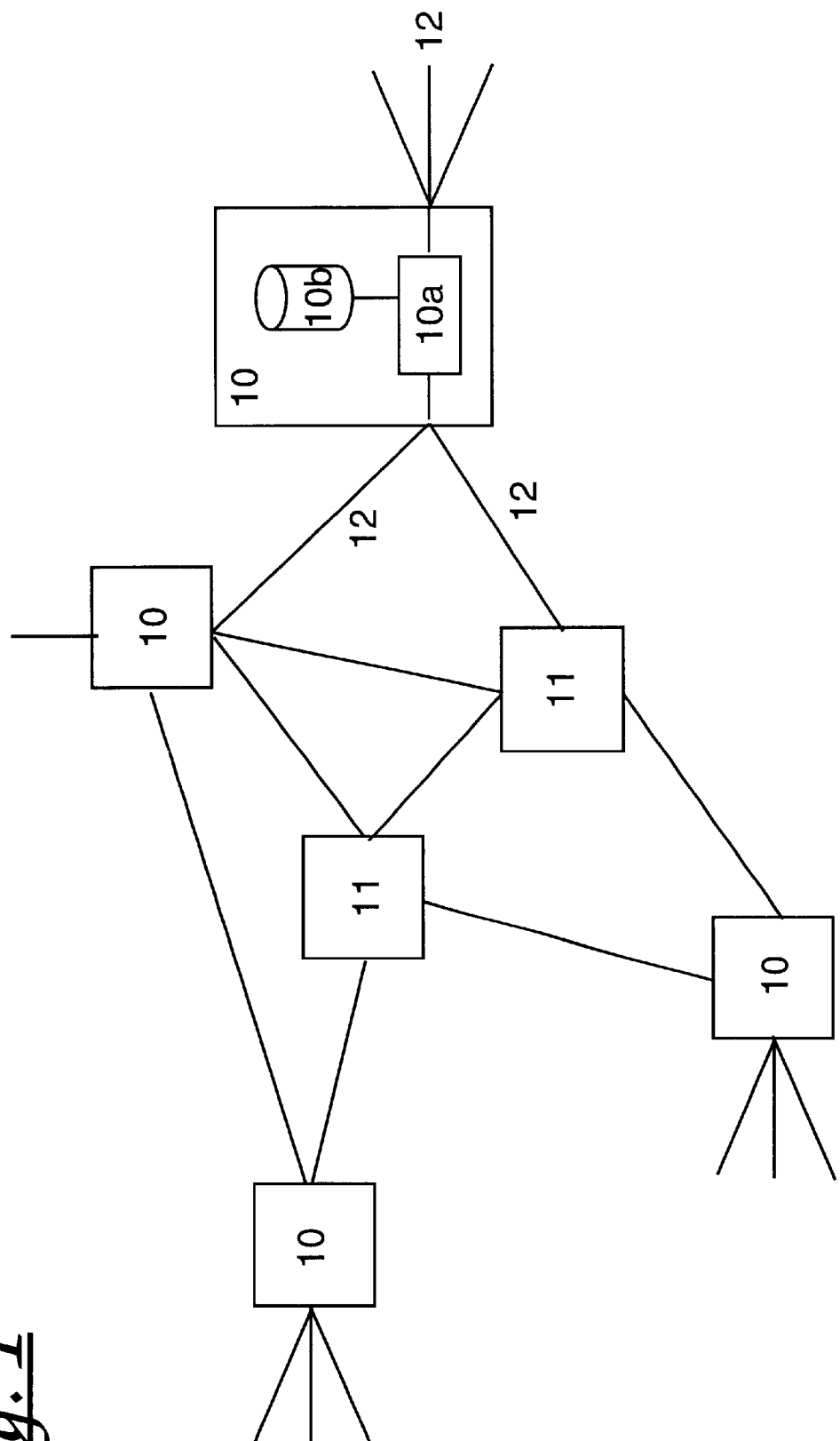
FIG. 1 shows an example of a Internet Protocol network.
Figure 2:
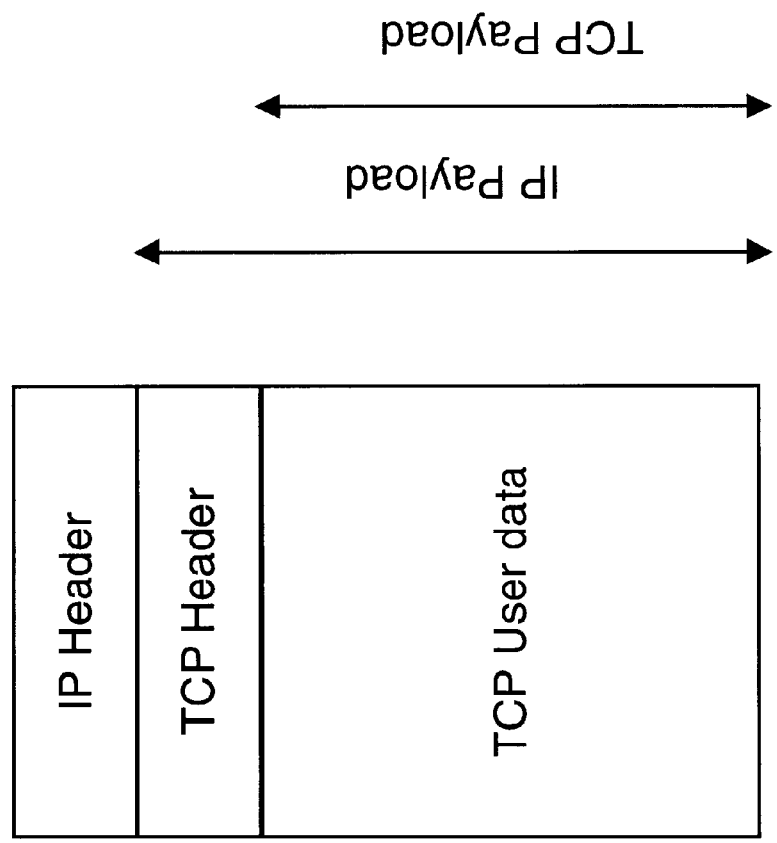
FIG. 2 shows an example of the structure of an Internet Protocol datagram.

The present invention is designed to operate in the context of the Internet Engineering Task Force (IETF) Differentiated Services (DS) architecture which provides a framework for implementing additional services with enhanced QoS.

To avoid problems of scalability in the core of large networks, where there are many hundreds or thousands or millions of flows of packets, the QoS cannot be specified at the granularity of individual flows in the core of the network. The treatment of packets in the core of the network to achieve the desired QoS must be very simple: there is very little time and processing effort available for each packet in a network core device in which a new packet may be arriving as frequently as every 50–100 ns.

DS works around these difficulties by working only with aggregates of traffic flows rather than individual flows and pushing as much functionality as possible out to the edge of the network, leaving some very simple mechanisms in the core.

The proposed architecture for DS provides for two kinds of node (normally routers) to be built into a closed DS network domain. At all the ingress and egress nodes of this network domain are DS Edge Devices which implement traffic conditioning functionality. The interior nodes (if any) which provide the interconnection of the domain are DS Interior Devices.

Both DS Edge and DS Interior Devices in a given DS Domain must implement a consistent set of forwarding treatments which are known as Per Hop Behaviours (PHBs). The DS architecture supports enhanced Quality of Service (QoS) for Internet Protocol (IP) services by means of marking each individual packet used to deliver data across an IP network with a code comprising a small number of bits.

Every traffic aggregate which passes through a DS node is marked with a DS codepoint (6 bit number) which indicates the class of the traffic. The codepoint is used (for example using a mapping table) to select the PHB to which the traffic is subjected as it passes through a node.

The traffic conditioning functionality in the DS Edge Nodes is used to ensure that traffic aggregates are correctly marked and are within any contract (Service Level Agreement) which a customer of the DS Domain may make with the domain owner. The traffic conditioning will normally involve admission control mechanisms which can dynamically admit or reject portions of the traffic aggregate to ensure that the SLA is not contravened. This can be done in various ways on a packet by packet basis or admitting or rejecting completely component flows.

To date packet-by-packet admission control has focussed on metering the rate of flow associated with an aggregate and either discarding packets which are in excess of the agreed rate or offering inferior service to these packets by altering their codepoint.

Such a mechanism is appropriate for applications which generate long term flows of data (such as file transfers or voice communications) but is unsuited to transactional flows where the concept of an agreed flow rate is not relevant. Typically all packets associated with a single (long term) flow would be initially marked with the same code; a traffic conditioning mechanism would then mutate the marking rate to an alternative value for the proportion of packets that exceed the agreed flow (or alternatively, excess packets could be discarded).

Routers which process the packets as they are forwarded across the IP network inspect the code and treat each packet marked with the same value in the same way when determining the priority or preference to give to those packets on the next hop of their path through the network. Each set of similarly-marked packets constitutes an class, and by applying different treatments to different classes a different quality of service can be obtained for each class. For example, access to a portion of the network may be refused to traffic in a given class which exceeds, in some measurable way, a previously agreed contract typically known Service Level Agreement (SLA).

Because of the nature of the packet traffic generated by an application requiring a transactional service (for example web page request and download) it is difficult to create such a Service Level Agreement based on a single class for such packets. The network is unable to predict or readily control the load imposed by traffic of this nature.

In essence the load created by such traffic can be characterised as follows: a request imposes a load to be transferred from client-to-server which can be characterised as a time-limited data 'chunk'; the request induces a response, which is also a time limited data 'chunk', in the server-to-client direction; and for each specific type of application the sizes of these chunks can be characterised statistically.

Thus on a network which is supporting a significant number of these transactions the overall load can be predicted with considerable certainty provided that the number of requests and responses in transit can be monitored by the network.

In order to be able to control the load being carried by a service for transactional applications, the routers and other network elements routing the packets need a mechanism which will allow them to admit and exclude traffic according to the actual and predicted load which the network will be carrying during the duration of a transaction which is about to start.

In general terms it is not possible for a device or network which is not originating this traffic to determine the start and finish of such transactions. Consequently a suitable service cannot be delivered using a single class for all such packets.

In a first embodiment of the present invention:

The initial packet of each request and response is marked as belonging to a specific class, A.

Those packets which are transmitted neither first nor last within a request or response are marked with a third class, B, which is distinct from A.

The final packet of each request and response is marked as belonging to an class, C, which is distinct from both A and B.

Where a request or response comprises a single packet, an additional mark is used to indicate membership of both forwarding classes A and C.

In addition, and for each class of traffic, the router can be provided with statistical distribution information characterising the nature of transactions of that class.

Referring now to FIG. 1, there is shown a network of routers 10–11 of which some 10 support network access functionality whilst other 11 may not. Each router comprises a processor 10a connected to input streams on its connections 12 and may comprise a storage medium 10b. As each packet passes through a router in a network, the router can keep track of the difference between the number of transaction start (A) and transaction end (C) packets which have passed in a particular direction it. This gives a count of the number of transactions currently in progress at any given time. Combining this information with the known statistical distribution of the data traffic relevant to the application creating the data, enables the router to form a statistical estimate of the current load on the network, and specifically the load on the next link in the network along which that data is transmitted. Both the count of the number of transactions currently in progress and the statistical data may be stored on the local storage medium 10b.

The router can then use this traffic information to limit the total number of transactions in progress. This is achieved by making use of the flow control mechanisms of TCP which operate as follows. In normal operation, a transport layer connect ion using the TCP protocol is a windowing flow controlled reliable byte stream protocol. To achieve reliability a system of positive acknowledgements by the receiving station is used (i.e. every packet of data received is acknowledged by the receiver sending an ACK packet to the transmitter).

The flow control mechanism used by TCP is complex and is designed to allow TCP to adapt to the available transmission bandwidth and congestion state of virtually any transmission link.

As a reliable transport layer protocol, the TCP is responsible for providing an error-free stream of bytes, delivered in the correct sequence. Since the loss of data packets is possible, the TCP must perform retransmissions in order to achieve these characteristics.

In addition the TCP running in two communicating end-systems performs an end-to-end flow control on the data flow. The amount of data being sent by a TCP source is restricted by the window mechanism. At the beginning of a TCP connection, the TCP source can only send a small number of data packets. On receipt of the ACK frames for these data packets, the TCP source then increases the window size and sends more data. In this way the TCP window mechanism prevents a large number of data packets being initially sent into the network.

The window opening procedure has three phases:
rapid increase (P1) known as 'slow start',
slow increase (P2) known as 'congestion avoidance',
constant; with the window fully open (P3).

Initially the window size is one, and the source can send just one data packet. On receipt of the ACK frame the window is increased to two packets and two new packets can be sent. For each received ACK frame, the TCP window is increased by one packet size and one window's worth of new data packets will be sent. Hence, this phase is called the exponential growth zone since the value of the TCP window size increases exponentially: 1, 2, 4, 8, 16 and so on for each round trip cycle.

When the TCP window reaches half of its maximum size, the slow increase phase is entered. In this phase the growth slows down and increases by only one data packet per round trip time (RTT); that is when all data packets from the current window become acknowledged. This phase ends when the TCP window becomes fully open. When the TCP window is fully open the TCP connection is in a kind of equilibrium, since as a packet leaves the network a new packet enters. The TCP has a self-clocking time window size mechanism which is maintained by ACK frames. The delay experienced by a data packet and its ACK frame is used to dynamically adjust the data flow to both the available bandwidth and the prevailing network loading.

When a TCP data packet is lost, the sender can recover using either the Fast Retransmit scheme or to wait for the retransmission time-out to expire. The Fast Retransmit scheme is triggered on the arrival of at least three duplicate ACK frames which indicates the need for the missing packet to be retransmitted. This retransmission is followed by the Congestion Avoidance procedure which reduces the TCP window size by half. In contrast, if the sender relies on the retransmission time-out, the packet transmission rate is reduced drastically since the retransmission is followed by the Slow Start procedure with the window size reset to 1 packet. As can be seen, in both cases the value of the traffic offered by a sender to the system decreases but, in the second case, the decrease is more drastic.

According to the present invention, packets are preferably discarded while the protocol is in the slow start phase when the window size is one, rather than in any later stage. The corresponds to discarding initial packets from a given transaction (i.e. those of class A). This effectively prevents the TCP session from sending any further packets on the connection until the retransmission timeout has expired, thereby limiting the load experienced by the network without any unnecessary packets being transmitted. If an initial packet of a transaction (i.e. a packet marked as of class A) is discarded by a router on its path through a network, (for example because the network management system considers the network to be too heavily loaded at that time to accept new transactions), the packet will not be received at its destination and hence not acknowledged back to the originating sender. According to the TCP transmission scheme described above, the initial packet will have been sent during the TCP slow start phase, and specifically when the window is just one packet wide (the situation when the session has just been initiated). No following packets (of classes B and C) from the same transaction will be transmitted until the start packet (of class A) has been successfully acknowledged.

In due course, the TCP session sender retransmits the start packet in the normal course of the operation of the TCP protocol. If, at the time of this retransmission, the load on the network has decreased then the new copy of the start packet will be successfully forwarded and acknowledged following which the remainder of the transaction data (in packets marked as of classes B and C) will be passed across the network as normal. The start packet will be counted, incrementing the outstanding transaction load and thereby increasing the current estimate of traffic load. Processing of the corresponding end packet (of class C) causes the counter to be decremented, thereby reducing the current estimate of traffic load.

Consequently a network management system is able, simply by counting packets marked with first and last class codes, to estimate the approximate load currently imposed on the network by a transactional service as being the difference between the totals of such packets transmitted and acknowledged which representing the number of transactions in progress. This can be converted into an approximation of the load by reference to the statistical profile of the corresponding requests and responses.

This estimate of the load imposed by the service can be used by a network management system to deny admission to the network to new requests and responses simply by causing network nodes deliberately to discard all packets marked as being of the first class, A. This deliberate discarding is best carried out at the earliest opportunity in the path the packet follows in the network, ideally at the access nodes at the periphery of the network, so as to avoid unnecessary intra-network traffic which is subsequently discarded. Such discarding of initial packets continues until the network load reduces to a level at which new transactions are to be admitted, according to some admission control criterion. The TCP protocol retransmits such initial packets until one is allowed through.

The present invention therefore provides an improved means of packet-by-packet admission control in a DS context. The class marking provides a means by which a service can be offered which both allows a user application to influence the behaviour of the network such that it behaves in way which better reflects the needs of the network, and allows a network operator to control the load imposed by customers by selectively blocking parts of customer traffic flows.

This packet marking mechanism allows useful quantitative SLA's to be offered for transactional services that were not previously possible. With this added ability to control the load on the network in this way, transactional services can offer enhanced assurances on the delivery of the data 'chunks' by appropriate use of priority and reservation of resources.

Whilst the invention has been described in terms of a single set of three classes, the invention can also be applied simultaneously on a per class of traffic basis, allowing different levels of control and different statistical characteristics to be employed for different classes of traffic.

In a first preferred embodiment of the present invention, an Internet Protocol header field, called the Differentiated Services (DS) field, is defined, which replaces the existing definitions of the Internet Protocol version 4 (IPv4) ToS octet and the Internet Protocol version 6 (IPv6) Traffic Class octet.

Figure 3:
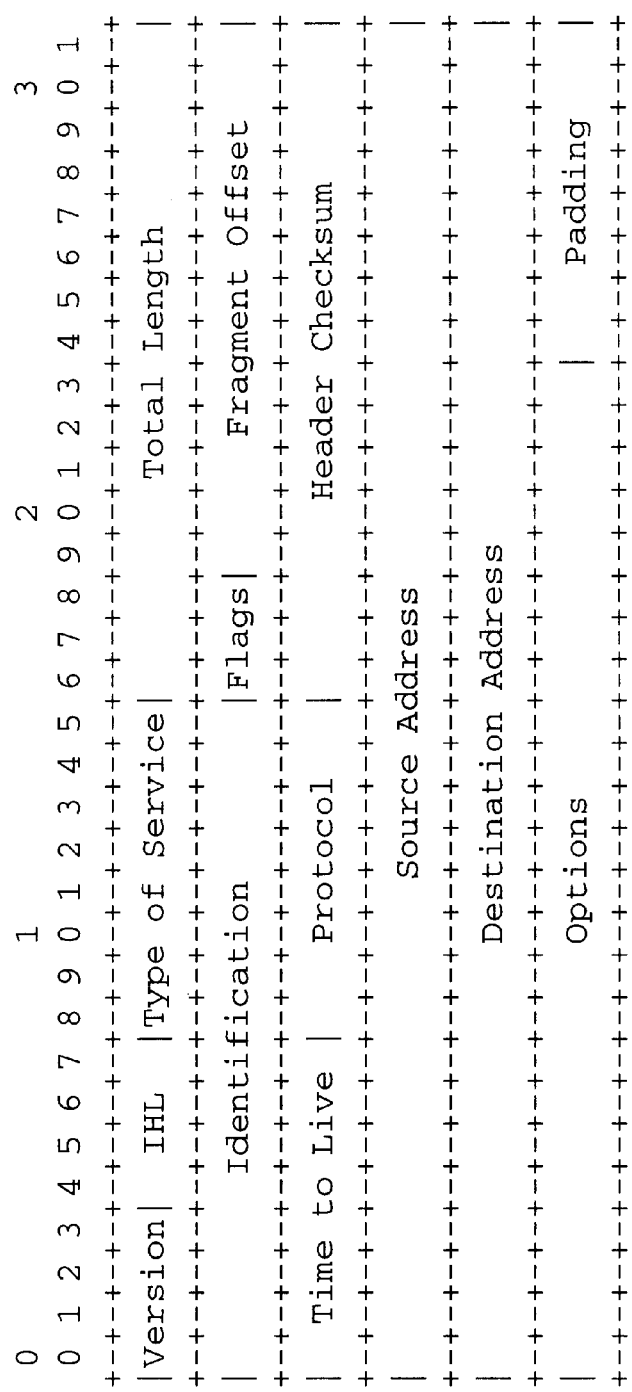
FIG. 3 shows a schematic diagram of the structure of an Internet Protocol version 4 packet header.

Referring now to FIG. 3, there is shown a schematic summary of the contents of an Internet Protocol version 4 packet header showing the fields which it comprises: Version, Internet Header Length (IHL), Type of Service (ToS), Total Length, Identification, Flags, Fragment Offset, Time to Live, Protocol, Header Checksum, Source Address, Destination Address, Options, and Padding. Each tick mark in the figure denotes one bit position.

Figure 4:
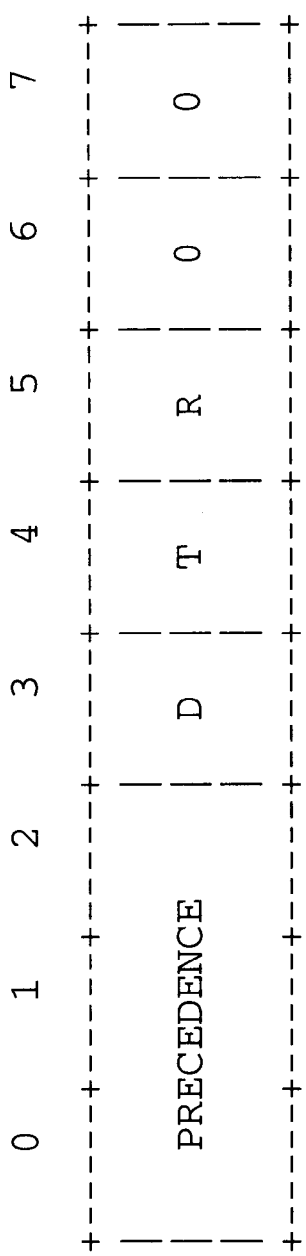
FIG. 4 shows a schematic diagram of the structure of the Type of Service field in an Internet Protocol version 4 packet.

Of these fields it is the Type of Service (ToS) field that is of interest in the present context. As shown in FIG. 4, it consists of 8 bits and provides an indication of the abstract parameters of the desired quality of service. The ToS parameters are to be used to guide the selection of the actual service parameters when transmitting a datagram through a particular network. Some networks offer a service precedence feature, which treats high precedence traffic as more important than other traffic. This is generally achieved by accepting only traffic above a certain precedence at time of high load. The major choice is a three way trade-off between low-delay, high-reliability, and high-throughput.

In the ToS field Bits 0–2 are used to indicate Precedence, Bit 3 is used to indicate Delay (D) (0=Normal Delay; 1=Low Delay.), Bit 4 is used to indicate Throughput (T) (0=Normal Throughput; 1=High Throughput), Bit 5 is used to indicate Reliability (R) (0=Normal Reliability; 1=High Reliability), and Bits 6–7 are reserved for future use.

The precedence combinations and corresponding functions are:
111—Network Control
110—Internetwork Control
101—CRITIC/ECP
100—Flash Override
011—Flash
010—Immediate
001—Priority
000—Routine The use of the Delay (D), Throughput (T), and Reliability (R) indications may be used to determine the price charged for a given type of service. Only one of these indicators may be set on a packet.

The Type of Service field is used to specify the treatment of the datagram during its transmission through the IP network.

The Network Control precedence designation is intended to be used within a network only. The actual use and control of that designation is at the discretion of each network operator. The Internetwork Control designation is intended for use by gateway control originators only. If the actual use of these precedence designations is of any concern in a particular network, it is the responsibility of the operator of that network to control the access to, and use of, those precedence designations.

Figure 5:
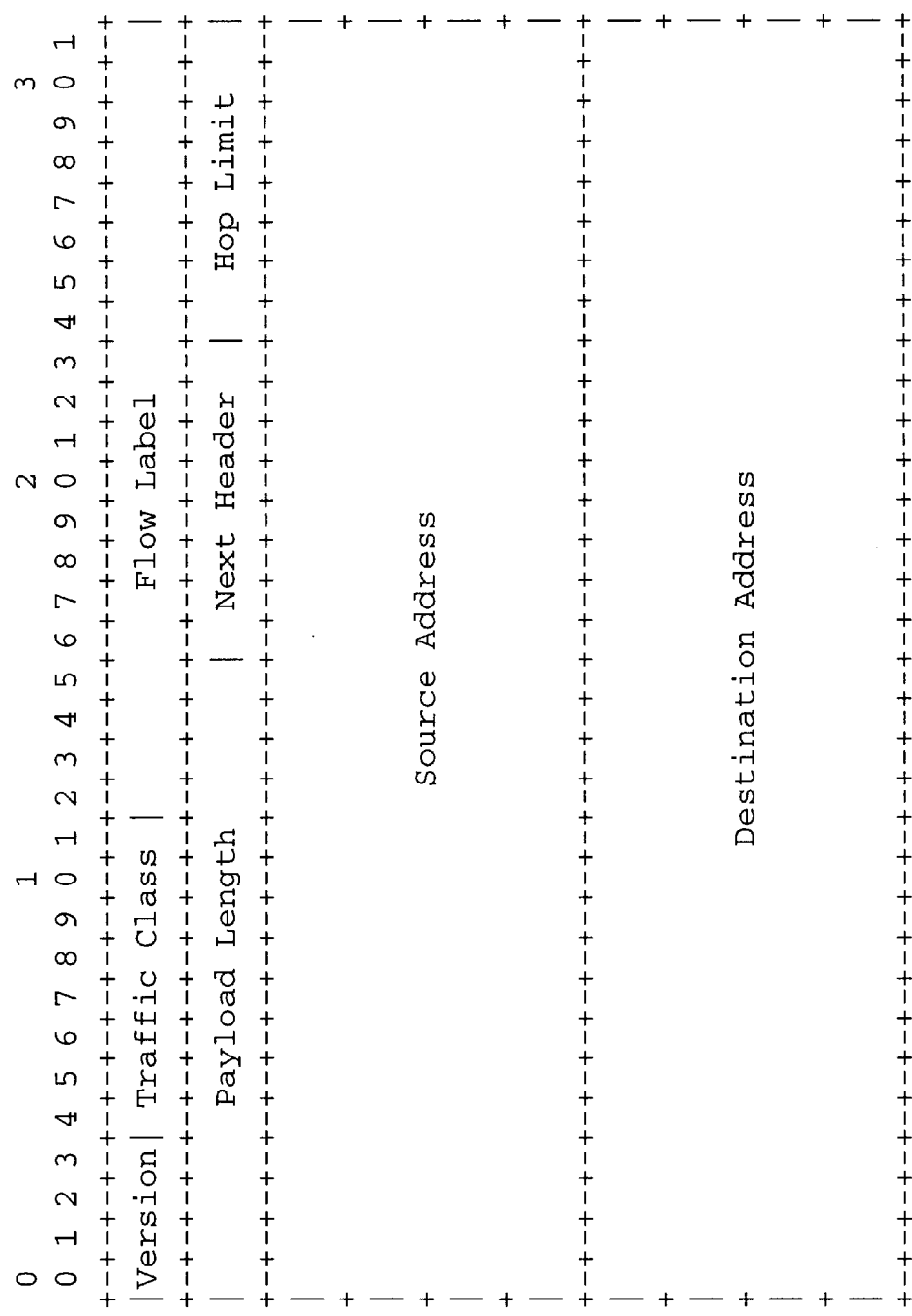
FIG. 5 shows a schematic diagram of the structure of a proposed Internet Protocol version 6 packet header.
Figure 6:
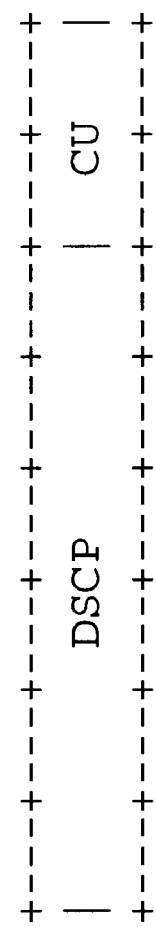
FIG. 6 shows a schematic diagram of the structure of the Differentiated Services field in a proposed Internet Protocol version 6 packet.

Referring now to FIG. 5 there is shown a schematic diagram of the corresponding structure of a proposed Internet Protocol version 6 packet header showing the fields which it comprises: Version, Traffic Class, Flow Label, Payload Length, Next Header, Hop Limit, Source Address, and Destination Address.

Of these fields it is the Traffic Class (TC) field that is of interest in the present context. The TC field consists of 8 bits.

Both the ToS field of IPv4 and the TC field of IPv6 are limited to eight bits in length. They can each be conveniently be replaced by an eight-bit Differentiated Services (DS) field as shown in FIG. 4. Bits 0–5 of the DS field are used as a Differentiated Services Codepoint (DSCP) to select the Per Hop Behaviour (PHB) that is applied to the packet at each node; Bits 6–7 of the DS field are used as a two-bit Currently Unused (CU) field, which may be assigned later (e.g. for explicit congestion notification) but which at present is not assigned for any specific use. The value of the CU bits are ignored by Differentiated Services compliant nodes when determining the PHB to apply to a received packet.

DS-compliant nodes select PHB's by matching against the entire 6-bit DSCP field, for example by treating the value of the field as a table index which is used to select a particular packet handling mechanism which has been implemented in that device. The DSCP field is defined as an unstructured field to facilitate the definition of future per-hop behaviours.

Because the mapping from DSCP to PHB is fully flexible, there is need be no permanent association of values in the DSCP field with classes. A typical example might be:

| DS Codepoint | Forwarding Class |
| --- | --- |
| 00100 | A |
| 00101 | B |
| 00110 | C |
| 00111 | A and C |

Admission control mechanisms such as the one proposed above are liable to exploitation by unscrupulous users who do not conform to the proposed marking pattern (e.g. by sending all packets marked as B).

The network can protect itself from this kind of exploitation by proposing that if end/start pairs are not identified within a given span of packets related to the expected size of transaction from that source, then the network will itself mark (for example, arbitrarily) two packets from class B to class C, and class A respectively. The class A packet would then be subject to admission control as for packets so marked by the user.

If the user continues to omit the sending of class A packets, the rate of marking by the network can be increased until alternate packets are being marked class A and then class C. The resulting decrease in potential throughput for that user transaction flow—in a worst case the entire transaction transfer might then be conducted in slow-start mode—acts to provide sufficient incentive to users to mark packets according to the proposed scheme so as to avoid random dropping of his packets and poor throughput.

Any range or device value given herein may be extended or altered without losing the effect sought, as will be apparent to the skilled person for an understanding of the teachings herein.

What is claimed is:

1. A method of monitoring telecommunications network traffic comprising the steps of:

receiving a packet stream comprising packets each comprising an indication of belonging to one of at least three classes;

calculating a difference between the numbers of packets received comprising an indication of belonging to a first and to a second of said classes; and deriving a measure of traffic load on the network responsive to said difference.

2. A method according to claim 1 comprising the steps of:

providing statistical distribution data descriptive of said traffic load;

deriving said measure of traffic load on the network responsive to said statistical distribution data.

3. A method according to claim 1 wherein said first class is indicative of the beginning of a transactional burst, and said second class is indicative of the end of a transactional burst.

4. A method according to claim 3 wherein each initial packet of a transactional burst is identified as belonging to said first class and each final packet of a transactional burst is identified as belonging to said second class.

5. A method according to claim 4 wherein a transactional burst comprises a single packet and said packet is marked as belonging both to said first and to said second classes.

6. A method according to claim 1 wherein an indication of which class a packet belongs to is contained in the header of said packet.

7. A method according to claim 6 wherein said packet is of an Internet protocol.

8. A method according to claim 7 wherein said packet is of an Internet Protocol version 4 having a header and said indication is located within a second octet of said header.

9. A method according to claim 7 wherein said packet is of an Internet Protocol version 6 having a header and said indication is located within the bits 4–7 of a first octet and bits 0–3 of a second octet of said header.

10. A method according to claim 6 wherein said header comprises a DSCP field and said indications are encoded using four values of said DSCP field.

11. A method of performing packet data network admission control comprising the steps of:
receiving a packet stream comprising packets each comprising an indication of belonging to one of at least three classes;
calculating a difference between the numbers of packets received identified as belonging to a first and a second of said classes;
deriving a measure of traffic load on the network responsive to said difference; and
accepting and rejecting the packets responsive to said measure.

12. A method of performing packet data network admission control comprising the steps of:
receiving a packet, comprising an indication of belonging to one of at least three classes, on a given traffic flow;
if said packet is of a first class indicative of the start of a new traffic burst then, if a previously stored measure of current traffic load is indicative of an admission rejection condition being satisfied in respect of said received packet discard said packet, otherwise increment said measure and forward said packet;
if said packet is of a second class not indicative of the start or end of a traffic burst then forward said packet; and
if said packet is of a third class indicative of the end of a traffic burst then decrement said measure of current traffic load and forward said packet.

13. A method according to claim 12 wherein said measure of current load is a difference between the number of packets of said first class previously forwarded and the number of packets of said third class previously forwarded.

14. A method according to claim 12 wherein an indication of which class a packet belongs to is contained in the header of said packet.

15. A method according to claim 14 wherein said packet is of an Internet protocol.

16. A method according to claim 15 wherein said packet is of an Internet Protocol version 4 having a header and said indication is located within a second octet of said header.

17. A method according to claim 15 wherein said packet is of an Internet Protocol version 6 having a header and said indication is located within the bits 4–7 of a first octet and bits 0–3 of a second octet of said header.

18. A method according to claim 14 wherein said header comprises a DSCP field and said indications are encoded using four values of said DSCP field.

19. A method of performing packet data network admission control method of claim 12 comprising the steps of:
receiving a traffic flow comprising data packets;
monitoring the rate of occurrence of packets indicative of starts and ends of transactional bursts within said traffic flow;
if said rate meets a suspected-abuse criterion, a first packet received on said traffic flow is marked as indicative of the start of a transaction and a second packet received on said traffic flow is marked as indicative of the end of a transaction;
if said packet is marked as indicative of the start of a new transaction then, if a previously stored measure of current traffic load is indicative of an admission rejection condition being satisfied in respect of said received packet, discard said packet, otherwise increment said measure and forward said packet;
if said packet is marked as not indicative of the start or end of a traffic burst then forward said packet; and
if said packet is marked as indicative of the end of a transaction then decrement said measure of current traffic load and forward said packet.

20. A method of transmitting traffic load information within a packet data stream comprising transactional bursts, comprising the steps of:
labelling each initial packet of transactional bursts as belonging to a first class;
labelling each final packet of transactional bursts as belonging to a second class;
labelling each other packet of transactional bursts as belonging to one or more further distinct classes
whereby to identify starts and ends of such transactional bursts within a packet data stream.

21. A packet network node comprising:
an input arranged to receive a packet stream comprising packets each comprising an indication of belonging to one of at least three classes;
a processor arranged to calculate a difference between the numbers of packets received identified as belonging to a first and a second of said classes and to calculate a measure of traffic load on the network responsive to said difference.

22. A packet network node comprising:
an input arranged to receive a packet traffic flow comprising packets each of which comprises an indication of belonging to one of at least three cases;
a processor arranged to determine for each packet received on said traffic flow, (a) whether said packet is of a first class indicative of the start of a new traffic burst and if so, to determine whether a previously stored measure of current traffic load is indicative of an admission rejection condition being satisfied in respect of said received packet and if so to discard said packet and otherwise to increment said measure and forward said packet, (b) whether said packet is of a second class not indicative of the start or end of a traffic burst and if so to forward said packet, and (c) whether said packet is of a third class indicative of the end of a traffic burst and if to decrement said measure of current traffic load and forward said packet.

23. A packet network node for performing packet data network admission control comprising:
an input arranged to receive a packet traffic comprising data packets;

a processor arranged to monitor the rate of occurrence of packets indicative of starts and ends of transactional bursts within said traffic flow; if said rate meets a suspected-abuse criterion, to mark a first packet received on said traffic flow as indicative of the start of a transaction and to mark a second packet received on said traffic flow as indicative of the end of a transaction; if said packet is marked as indicative of the start of a new transaction then, if a previously stored measure of current traffic load is indicative of an admission rejection condition being satisfied in respect of said received packet to discard said packet, otherwise to increment said measure and forward said packet; if said packet is marked as not indicative of the start or end of a traffic burst then to forward said packet; and if said packet is marked as indicative of the end of a transaction then to decrement said measure of current traffic load and to forward said packet.

24. A communications system comprising a plurality of nodes according to claim 21.

25. A communications system comprising a plurality of nodes according to claim 22.

26. A communications system comprising a plurality of nodes according to claim 23.

27. A program for a computer on a machine-readable medium for monitoring telecommunications network traffic comprising code portions for:

receiving a packet stream comprising packets each comprising an indication of belonging to one of at least three classes;

calculating a difference between the numbers of packets received comprising an indication of belonging to a first and to a second of said classes; and deriving a measure of traffic load on the network responsive to said difference.

28. A program for a computer on a machine-readable medium for performing packet data network admission control comprising code portions for:

receiving a packet, comprising an indication of belonging to one of at least three classes, on a given traffic flow;

if said packet is of a first class indicative of the start of a new traffic burst then, if a previously stored measure of current traffic load is indicative of an admission rejection condition being satisfied in respect of said received packet discard said packet, otherwise increment said measure and forward said packet;

if said packet is of a second class not indicative of the start or end of a traffic burst then forward said packet; and if said packet is of a third class indicative of the end of a traffic burst then decrement said measure of current traffic load and forward said packet.

29. A program for a computer on a machine-readable medium for transmitting traffic load information within a packet data stream comprising transactional bursts, comprising code portions for:

labelling each initial packet of transactional bursts as belonging to a first class;

labelling each final packet of transactional bursts as belonging to a second class;

labelling each other packet of transactional bursts as belonging to one or more further distinct classes whereby to identify starts and ends of such transactional bursts within a packet data stream.

* * * * *